June 13, 1961  R. C. ALBRECHT ET AL  2,987,775
METHOD OF FORMING PLASTIC CONTAINERS
Filed July 10, 1957  5 Sheets-Sheet 1

INVENTORS
RANSOM C. ALBRECHT
EDGAR G. HEYL

BY Cushman, Darby & Cushman
ATTORNEYS

June 13, 1961  R. C. ALBRECHT ET AL  2,987,775
METHOD OF FORMING PLASTIC CONTAINERS
Filed July 10, 1957  5 Sheets-Sheet 2

INVENTORS
RANSOM C. ALBRECHT
EDGAR G. HEYL
BY Cushman, Darby & Cushman
ATTORNEYS

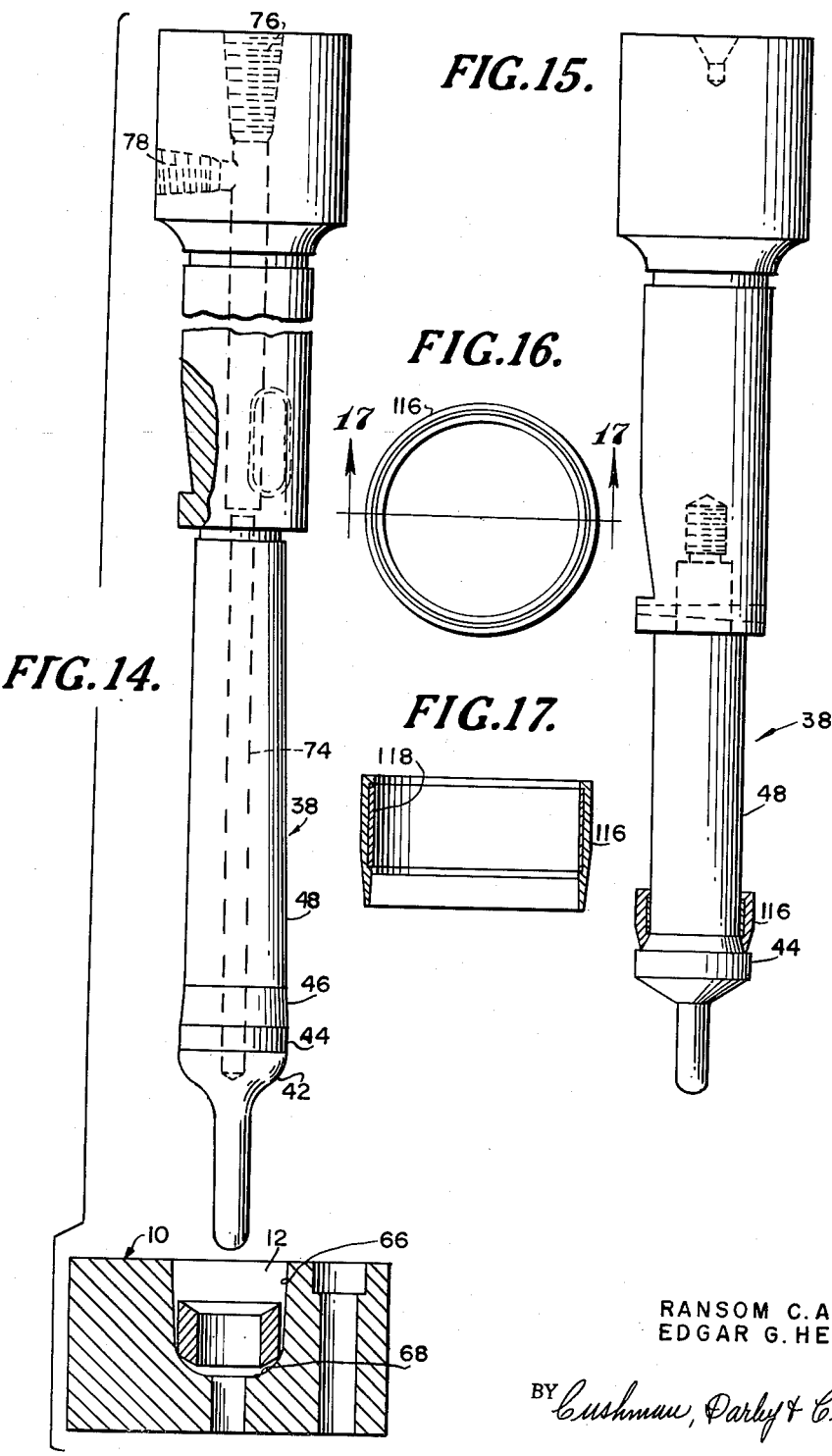

INVENTORS
RANSOM C. ALBRECHT
EDGAR G. HEYL

June 13, 1961  R. C. ALBRECHT ET AL  2,987,775
METHOD OF FORMING PLASTIC CONTAINERS
Filed July 10, 1957  5 Sheets-Sheet 5

INVENTORS
RANSOM C. ALBRECHT
EDGAR G. HEYL

BY Cushman, Darby & Cushman
ATTORNEYS

2,987,775
METHOD OF FORMING PLASTIC CONTAINERS
Ransom C. Albrecht and Edgar G. Heyl, both % Crown Cork & Seal Co. Inc., Baltimore 3, Md.
Filed July 10, 1957, Ser. No. 671,051
15 Claims. (Cl. 18—55)

This application is a continuation-in-part of application Serial No. 578,506, filed April 16, 1956, now abandoned, the entire disclosure of which is hereby incorporated.

This invention relates to the molding of thermoplastic synthetic resins into tubes.

It is an object of the present invention to form tubes from thermoplastic synthetic resins in a simpler and more economical manner than has previously been possible.

A further object is to reduce the time necessary to form tubes and bottles of thermoplastic synthetic resins.

An additional object is to make squeezable polyethylene containers in an improved manner.

It is another object of this invention to prepare clear, colorless, transparent polyethylene tubes.

A still further object is to prepare containers from thermoplastic synthetic resins having a thicker head portion than body portion.

Yet another object is to eliminate the sliding friction of the thermoplastic resin when it climbs up the impact extrusion punch.

Still another object is to form impact extruded polyethylene tubes in an improved and novel manner.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been known for over 100 years that it is possible to impact extrude metals with the aid of a thrust plunger to form containers such as the conventional tooth paste tube. However, despite the fact that thermoplastic synthetic resins have been molded in one manner or another, e.g., by casting or extrusion, etc., for over thirty years, it has not been recognized that it was possible to form such resins into tubes by impact extrusion with a thrust plunger. It has now been found that it is indeed possible to form thermoplastic synthetic resins into tubes, bottles, squeezable containers, etc. by impact extrusion. For best results, appropriate changes are made in the techniques employed for impact extruding metals, as set forth subsequently.

The process of impact extrusion has been found to be especially adaptable for forming tubes, squeezable bottles and other containers from polyethylene. The polyethylene can have a molecular weight of from 2000 to 25,000 or even much higher, e.g., 1,000,000 or over. Usually, the molecular weight is between 12,000 and 18,000. Polyethylene is the preferred synthetic resin because it has a relatively low elastic limit and a relatively high break limit, and has other valuable properties for making containers. The greater the break limit the more suitable is the material. By a break limit is meant that point beyond which the material actually shears or separates when stretched. By elastic limit is meant the point beyond which, upon stretching, the material will not return completely to its original dimension before stretching. Desirably, the material has an elastic limit of at least 300%, i.e., it can be stretched at least three times its original length, and preferably has a break limit of at least 600%.

It has been found advantageous to have a break limit of at least twice the elastic limit and, desirably, the break limit is three or more times the elastic limit.

There can be employed other materials having the critical characteristics described above. Desirably, resins such as plasticized vinyl chloride resins, e.g., plasticized polyvinyl chloride and plasticized copolymers of vinyl chloride with other monomers such as vinylidene chloride, acrylonitrile and vinyl acetate, polyvinyl alcohol, polyvinyl acetals, e.g., polyvinyl butyral, and polypropylene.

The polyethylene can be modified with minor amounts of other materials. For example, there can be used 5% or less of substances, e.g., 1 or 2% of polyisobutylene (Vistanex) or 1 or 2% of isobutylene-diolefine copolymer, e.g., isobutylene-isoprene and isobutylene-butadiene (Butyl rubber), 1 or 2% of hydrocarbon waxes, such as paraffin wax having a melting point of 133° to 135° F., fillers, such as calcium carbonate, e.g., in an amount of 10%, titanium dioxide in an amount of 1%, stearates such as calcium and butyl stearates, as well as pigments, etc.

The presence of either polyisobutylene or Butyl rubber improves the stretching characteristics and, to some extent, appears to improve the strength of the composition. The paraffin waxes and the stearates serve as lubricants in the forming operation. The fillers referred to, in addition to their pigmenting qualities, in the present instance, help to improve the stretching characteristics without substantially impairing the breaking point. This is noticeable, for example, when 15% of calcium carbonate is mixed with the polyethylene. In this connection, the stearates also appear to help the stretching qualities of the polyethylene composition.

In addition to the composition above described, laminar products are also useful in connection with the process of this invention, notably polyethylene coated with one or more of the following: plasticized vinyl chloride resins, e.g., polyvinyl chloride, vinyl chloride copolymers, such as vinyl chloride-vinyl acetate copolymers, vinylidene chloride resins, such as polyvinylidene chloride, vinyl chloride-vinylidene chloride copolymers, vinyl chloride acrylonitrile copolymers, polyvinyl alcohol, vinyl alcohol-vinyl acetate copolymers, and polyvinyl butyral and, in addition, laminar structures of two different polyethylenes may be used, e. g., one layer having a molecular weight of 18,000 and another layer having a molecular weight of 20,000, or one layer having a molecular weight of 18,000 and another layer having a molecular weight of 15,000. Also, as will be appreciated, one of the layers may be polyethylene and another of the layers may be polypropylene. In connection with the laminar structures having different molecular weight polyethylene layers, these layers may also have different colors or other different modifying agents.

The polyethylene can have a laminate on either one or both sides thereof. With plasticized materials such as the vinylidene chloride resins which do not have a particularly high break limit, it is desirable that the coating be relatively thin, e.g., of a thickness not over about 10% of the thickness of the polyethylene layer.

The laminar structures can be produced from planchettes made by fusion of the polyethylene surface with the surface of the other laminating material or, alternatively, the lamination can be accomplished by coating the polyethylene with a solution of the laminating material or conversely, or other suitable conventional means of lamination can be employed after formation of the tube.

In connection with the formation of a laminar structure, and particularly one produced by the application of a solution of a laminating material as indicated above, the polyethylene surface can be preliminarily treated with a composition comprising hydrogen peroxide with a detergent which is a wetting agent and if it is desired to accelerate the treatment, a suitable accelerator can be introduced. Preferably, the hydrogen peroxide is introduced as a 15% aqueous solution, and a wetting agent, such as one of the well known alkyl sulphonates, e.g., Tergitol No. 7, is included in amount to improve the wetting properties of the peroxide solution. By the use of this composition with or without the accelerating agent, the polyethylene appears to be oxidized. This is evidenced during the treatment by the presence of bubbles in the bath, and by the further fact that the lamination or coating is received and permanently united to the treated polyethylene surface. In some cases, as where the layer applied to the polyethylene is preformed, the same can be treated with the solution or bath as just described or both the surface of the polyethylene and such preformed layer may be so treated.

Further, in connection with the laminated structure, the aforementioned treatment can be used to assure that an adhesive used to unite two preformed layers will permanently be adhered to one or both of said layers for the purpose of uniting the same.

The drawings illustrate the formation of cylindrical tubes having heads of reduced diameter extruded from a planchette or billet of polyethylene having a molecular weight of about 18,000.

In the drawings:

FIGURE 14 is a vertical view partially in section of an alternative and presently preferred form of plunger and die;

FIGURE 15 is a vertical section of a plunger having a sleeve;

FIGURE 16 is a top elevation of the sleeve of FIGURE 15;

FIGURE 17 is a section on the line 17—17 of FIGURE 16;

While the drawings illustrate several combinations of necks and end closures, it will be appreciated that any type neck can be utilized with any type end closure. Similarly, tubes with any type of neck can be formed with any of the planchettes.

Figure 1:
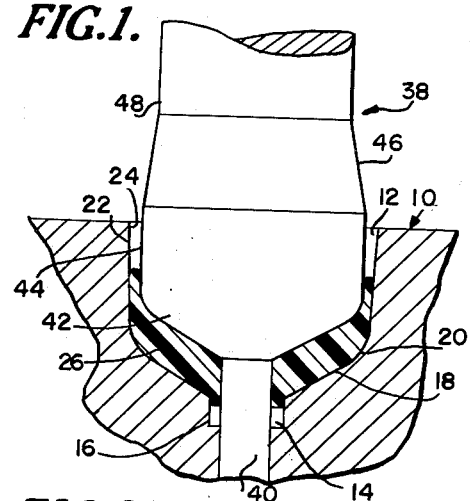
FIGURE 1 is a vertical section showing the plunger in contact with the planchette just after the resin has started to move up the wall of the die.
Figure 6:
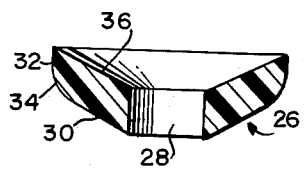
FIGURE 6 is a vertical section of a planchette.

Referring more specifically to FIGURE 1 of the drawings, there is provided a female mold 10. The die cavity 12 has a vertical axis of symmetry and has a bottom central cavity 14. The lower end of the central cavity 14 is open for the greater part of the diameter thereof. Wall 16 of the central cavity is vertical. The wall section 18 of the die cavity 12 tapers upwardly and outwardly from the top of the central cavity at a substantial angle to shoulder 20. In FIGURE 1, this angle of taper is 30°. From shoulder 20 the wall section 22 of the die cavity tapers upwardly to the upper end 24 at a very slight angle to the vertical axis, e.g., 0°30' or more preferably 0°15' to form a frusto-conical portion. A slug or planchette 26 of a thermoplastic synthetic resin of the class described, e.g., low viscosity polyethylene having a melt index of about 10 and a molecular weight of about 18,000, is inserted into the mold. The planchette preferably has a central opening 28 to avoid waste of material in the tube forming operation and for the additional reasons set forth below. The planchette 26 employed in FIGURE 6 has the general appearance of a truncated cone with one significant difference. The bottom wall 30 of the planchette tapers upwardly and outwardly from the central opening 26 at the same angle of taper as the wall section 18 of the mold so that the planchette rests in the die cavity supported by the wall section 18. Bottom wall 30 merges into vertical side wall 32 in a rounded corner 34. Top wall 36 of the planchette tapers upwardly and outwardly from the central opening 28 at an angle which is substantially less than the angle of taper of the wall section 18 of the mold. In FIGURE 6 the taper of the top wall 36 is 25°. The smaller angle taper of the top wall 36 than the bottom wall 30 aids in letting air out of the mold during the forming operation.

To form the planchette 26 into a tube, there is thrust or impacted thereon plunger or punch 38. The plunger has a vertical axis of symmetry and includes a vertically walled lead or head 40 which has the same diameter as the diameter of the opening in the bottom of central cavity 14. The plunger is outwardly and upwardly tapered at 42 from the top of the lead 40 to a land section 44. The angle of the taper is substantially the same as that of the mold wall 18. The land 44 has a vertical side wall.

The plunger 38 is tapered back at 46 from the land to a vertically walled stem portion 48 of lesser diameter than the land. It has been found that by having the reduced wall portion 48 on the plunger there is eliminated much of the undesirable friction which would otherwise result as the tube rides up the punch during the forming operation.

Due to the slight taper in the upper wall section 22 of the die while the corresponding wall of the land 44 is vertical, the space between the land and the die wall becomes progressively less as the plunger descends into the die cavity. This has the advantage that it allows the resin material to move freely and expand and to relieve the built-up pressure so that the tube wall will build up substantially uniformly. The 0°30' (or 0°15') taper or relief on the die wall also permits the plastic to relax a little during the forming operation.

After the finished container or tube 50 (FIGURE 2) having a reduced diameter open neck 52 with conical wall 54 connecting the neck with the main vertically walled section 56 is formed by impacting the plunger 38 into the die, the plunger is removed from the die. The tube adheres to the plunger and can be readily removed therefrom by applying air pressure to blow off the tube.

In the specific example described in connection with FIGURES 1 and 2, the female mold was heated to 200° F., while the plunger was at 70° F. Alternatively, the mold can be heated to 175° F. or need not be heated. In another example, the plunger and die were at 130° F. In a third example, the plunger was at 70° F. and the die at 115° F. It is possible to carry out the impact extrusion wherein the die, plunger and planchette or any of them are at room temperature, i.e., 70° F., or 175° F. or 200° F. or wherein they have any temperature between 65° F. and 200° F. It is not necessary that the die, plunger and planchette or any two of them have the same temperature as successful results are obtained when they have differing temperatures. The plunger was impacted on the planchette with a force of 15,000 pounds p.s.i. to form a tube 4.5 inches high.

By the process of the present invention, there is obtained a straight-edged tube of the thermoplastic synthetic resin which requires no trimming after it is formed.

Figure 2:
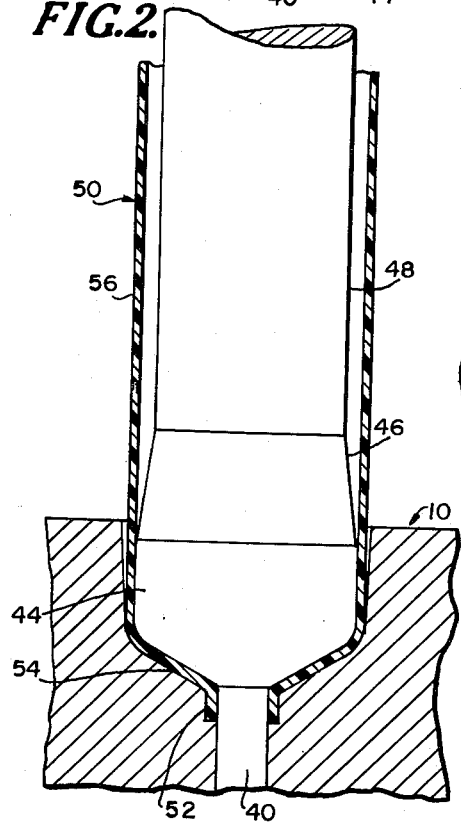
FIGURE 2 is a vertical section similar to FIGURE 1 showing a further stage where the resin has gone well beyond the walls of the die and the molding step is complete.

In the example illustrated by FIGURES 1 and 2, the mold had a central cavity 14 which was 0.3125 inch in diameter and 0.125 inch high. The opening in the bottom of the cavity was 0.25 inch in diameter. The vertical height of the tapered wall section 18 was 0.188 inch. The vertical height of the tapered wall section 22 was 0.463 inch. The maximum diameter of the die cavity at the upper end 24 was 0.905 inch. The planchette 26 had a maximum diameter of 0.895 inch, was 0.438 inch high and had a central opening 0.266 inch in diameter. The vertical distance from the top of the planchette to the upper end of the bottom wall 30 was 0.25 inch. The maximum diameter of the land 44 on the punch was 0.875 inch and the land had a vertical height of ⅜ inch between tapered shoulders 42 and 46. Tapered shoulder 46 had a vertical height of ¼ inch. The diameter of the stem 48 was 0.855 inch, leaving a clearance of 0.01 inch between it and the land. The clearance between the land the die cavity at the maximum point was 0.03 inch.

The thin walled tube formed in the example of FIGURES 1 and 2 had a height of thickness of 0.031 inch at the neck 52. There was a slight increase in thickness along the wall 56, the thickness being about 0.017 inch midway of the wall and about 0.020 to 0.021 inch at the end remote from the neck.

It will be observed that according to the invention there are prepared seamless tubes which may have conical or other shaped heads.

It is frequently desirable to treat the planchette of polyethylene or other thermoplastic material with a lubricant, e.g., glycerine, wax or a silicone prior to the forming operation. Preferably, there is employed dimethyl polysiloxane to form a thin surface film on the planchette. The planchette is then molded in the manner set forth.

Alternatively, the mold itself can be lubricated with the silicone directly.

It is possible to form tubes in less than one second by the present procedure. It has also been observed that the flow pattern when forming the tubes is basically laminar or strata type of flow. This has been established by molding blanks of multi-colored concentric layers of polyethylene.

Figure 12:
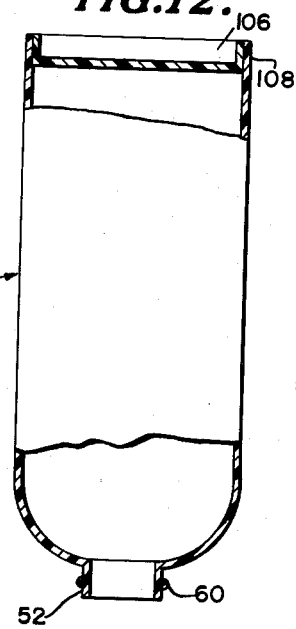
FIGURE 12 is a view similar to FIGURE 11 illustrating an alternative type of neck and bottom construction.

The neck of the container or tube can be formed with a bead if desired. Thus, in FIGURE 3 the bottom cavity 14 of the die for forming the container has an annular groove or recess 58. When an impact plunger hits a planchette in the die shown in FIGURE 3, the cylindrical tube which is formed will have a bead in the middle of the neck. FIGURE 12, for example, illustrates a squeezable polyethylene container 50 having a neck 52 with a bead 60 in the middle thereof which was formed using the die of FIGURE 3.

Figure 3:
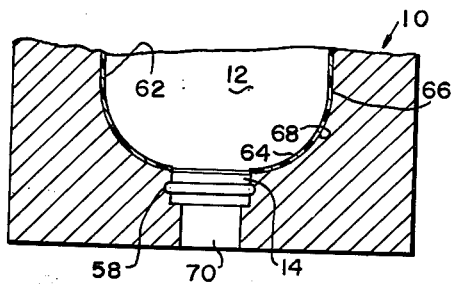
FIGURE 3 is a vertical section of a die for forming a tube having a bead in the middle of the neck.

The mold in FIGURE 3 has a thin film 62 of Mylar (polyethylene terephthalate) on the inner surface thereof. It has been found that by thus coating the mold when a polyethylene planchette is employed, the tube which is formed will be transparent. This is surprising since polyethylene tubes normally formed by impact extrusion or by any other methods are normally translucent unless special conditions are employed during and subsequent to the formation of the tube. It has been observed that the high polish of the Mylar skin on the mold is transformed to the polyethylene blank and gives clear, transparent tubes regardless of whether the polyethylene and/or the mold is hot, e.g., 175° F., or cold, e.g., room temperature.

It has also been observed that if instead of surfacing the mold with Mylar, the mold itself, e.g., of steel, brass or other metal, is given a highly polished surface and if the surfaces of the blank are smooth and polished, a transparent polyethylene tube is formed. The degree of transparency is dependent upon the amount of polish given the planchette. It has been observed that with the high degree of polish, it is possible to form transparent polyethylene tubes not only by impact extrusion but also by other conventional extrusion procedures. The important factor is that the surface of the polyethylene blank be given a high polish. In fact, not only tubes but even films of polyethylene can be made transparent if they are formed from highly polished blanks. Transparent walls as thick as 0.025 inch or even thicker can be obtained if the blank is highly polished while a dull or machined finish on the blank causes the tubes to be translucent.

For best results in the impact extrusion of tubes, the dimensions of the mold and the corresponding dimensions of the plunger, etc. are somewhat critical. Thus, for the manufacture of one size of container in the mold of FIGURE 3, for example, the maximum diameter of the die cavity 12 at the upper end was 0.9115 inch, the vertical height of the wall section 64 including tapered portion 66 and curved portion 68 was 0.906 inch. The angle of taper of the outwardly tapered portion was 0° 15′. The curved portion 68 had an upper diameter of .905 and was filleted at 0.3125 inch radius. The diameter of the bottom cavity 14, except for the recess 58 was 0.3125 inch, and the maximum diameter of the recess was 0.375 inch. The height of the bottom cavity was 0.125 inch, of which 0.031 inch was accounted for by the recess. Below the bottom cavity there is provided a guide 70 for the lead 40 of the plunger. The guide has a diameter of 0.25 inch. It will be appreciated that to form tubes of other sizes, while the dimensions will necessarily change, the proportions will be constant.

Figure 4:
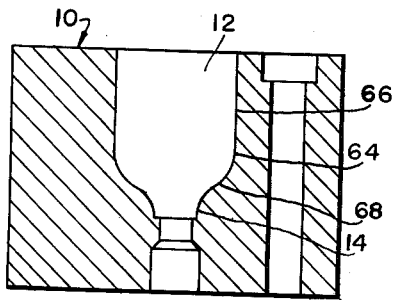
FIGURE 4 is a vertical section of a die for forming a tube having a beadless neck.

FIGURE 4 illustrates a die similar to that of FIGURE 3 but omitting the bead forming recess. In FIGURE 4 the wall of the bottom cavity 14 of the die was curved at the upper end and filleted at a 0.025 inch radius to merge into the curved portion 68 to form the neck of the container.

Figure 5:
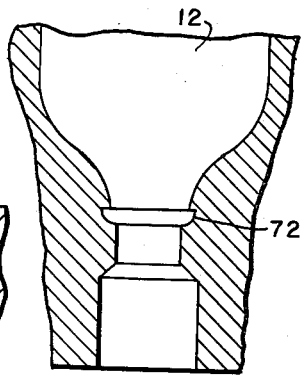
FIGURE 5 is a view similar to FIGURE 4 but showing a die for forming a tube having a bead at the end of the neck.

FIGURE 5 illustrates a die similar to that shown in FIGURE 4 but having an annular recess 72 at the lower end thereof in order to form a tube having a bead at the end of the neck.

FIGURE 14 illustrates a plunger 38 suitable for use with the die 12 of FIGURE 4. The plunger has a central cavity 74 connected with opening 76 for introducing heating or cooling fluid. Exit 78 is provided for the heating or cooling fluid. In this manner the temperature of the plunger can be regulated as desired. The maximum diameter of the land 44 on the punch was 0.875 and the land had a vertical height of 0.188 inch. Tapered shoulder 46 had a vertical height of 0.3125 inch. The diameter of the stem 48 was .865 inch. The curved section 42 of the plunger was contoured matingly with the bottom cavity 12. The clearance between the land and the die cavity at the maximum point was 0.0185 inch. The reduced wall portion was tapered inwardly at an angle of 0° 15′.

While it is possible to utilize a solid planchette, it has been found much more desirable to use a tubular planchette or blank. The stretch can be greatly increased and a more uniform tube made throughout its length by utilizing a tubular rather than a solid planchette. For best results, the central opening should be considerably greater than that of the guide 70 used to permit the lead on the land to pass through the bottom cavity 14. The wall thickness of the blank can be as much as 0.125 inch or more in forming polyethylene into squeeze bottles having a wall thickness of 10 to 50 thousandths of an inch. Thus, for example, there can be formed bottles 5 inches long, 1.5 inches in diameter and of 0.032 inch wall thickness from appropriate planchettes.

Figure 8:
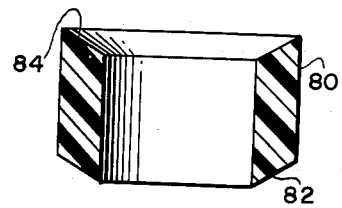
FIGURE 8 is a vertical section of an alternative and preferred type of planchette.

FIGURE 8 illustrates a presently preferred type of planchette 80 for use with the dies illustrated in FIGURES 3–5 and 14. The planchette has a maximum diameter of 0.895 inch and was 0.906 inch high. The central opening was 0.641 inch. The angle of upward and outward taper of both the bottom wall 82 and the top wall 84 is 30°. With this planchette there were formed smooth walled finished tubes of a height of 2.188 inches and wall thickness of 0.019 inch using polyethylene of 18,000 molecular weight. It is important, as previously explained, to exceed the elastic limit but stay within the break limit of the thermoplastic material during the impact extrusion step. In general, to make longer tubes, the length of the planchette should be increased.

Figure 7:
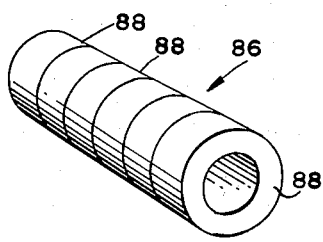
FIGURE 7 is a perspective view of a tube from which planchettes are cut.

The tubular planchettes can be formed by severing a conventionally extruded tube 86 into blanks 88 as shown in FIGURE 7. Alternatively, the planchettes can be stamped out of polyethylene or other plastic ribbon.

Figure 9:
FIGURE 9 is a vertical section of an idealized form of planchette.

FIGURE 9 illustrates a planchette 90 in the form of a right cylinder. The flatter the lower edge of the planchette, the less is the tendency for it to flow upwardly. However, at present the use of such a tubular planchette introduces problems in the molding procedure.

Figure 10:
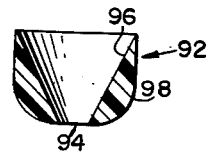
FIGURE 10 is a vertical section of still another form of planchette.

FIGURE 10 shows another type of planchette 92 having a maximum diameter of 0.895 inch and a height of 0.688 inch. The diameter of the bottom opening 94 is 0.266 inch. The angle of the inside wall 96 with the vertical axis is 25°. The lower portion of the outer wall 98 is filleted at a 0.3125 inch radius.

Figure 11:
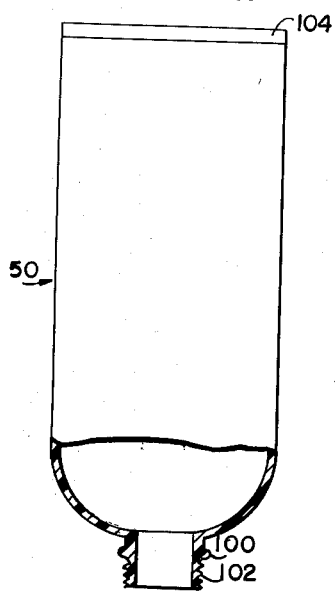
FIGURE 11 is a side elevation partially in section of a polyethylene tube.
Figure 13:
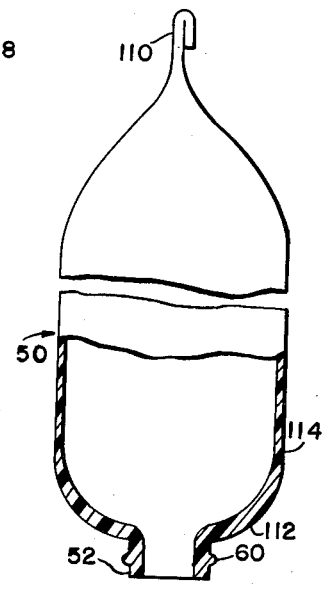
FIGURE 13 is a view similar to FIGURE 11 showing still another type of neck and bottom construction.

Various types of containers prepared by impact extrusion are illustrated in FIGURES 11, 12 and 13. In FIGURE 11 the polyethylene container 50 was formed with a bead 100 and external threads 102 on the neck. The bottom 104 was heat sealed in conventional fashion to form a closure similar to that on toothpaste tubes. Alternatively, a plug 106 can be inserted into the bottom and heat sealed or otherwise adhered as by a suitable adhesive to the side wall as in FIGURE 12. In FIGURE 13 the wall 110 is bent over on itself before heat sealing in order to form the bottom closure.

It is possible to form a thicker conical head 112 than body 114 on the tube by positioning the maximum stroke of the punch with relation to the bottom of the die. In general, the shorter the stroke of the plunger, the thicker will be the head in relation to the body. The advantage of increasing the thickness of the head is that it makes for a stronger neck.

It has been observed that there is considerable sliding friction of the polyethylene when climbing the punch. This can be materially reduced by utilizing a sliding collar 116, FIGURES 15–17, on the punch 38. When the plunger hits the planchette, the tube as it is formed rides up the collar 116. The collar is made of aluminum or other metal and has an inner sleeve 118 of Teflon (polytetrafluoroethylene) to keep the friction to a minimum as the collar and forming tube ride up the plunger.

When diffusible materials are packaged in a polyethylene container, the polyethylene can be coated inside and/or out with a resistant material. It has been observed that the use of medium density polyethylene reduces diffusion and also that the stretching process itself also decreases the amount of diffusion.

It has been found, for best results, in terms of forming a uniform tube, that downward pressure should be reduced and the side thrust increased. This procedure results in reduced distortion on the blank while the punch is working thereon and the blank is thus not damaged by contact with the punch. This eliminates riffles or fish scaling, which sometimes otherwise occur. In general, for best results, the side pressure should be greater than the downward pressure.

In brief, the action of the method and apparatus of this invention is to form the tube from the blank in such a progressive manner that tube formation, as it proceeds from the continued downward stroke of the punch, does not disturb the original configuration of the remaining portion of the blank until the same is acted upon by the punch.

Figure 18:
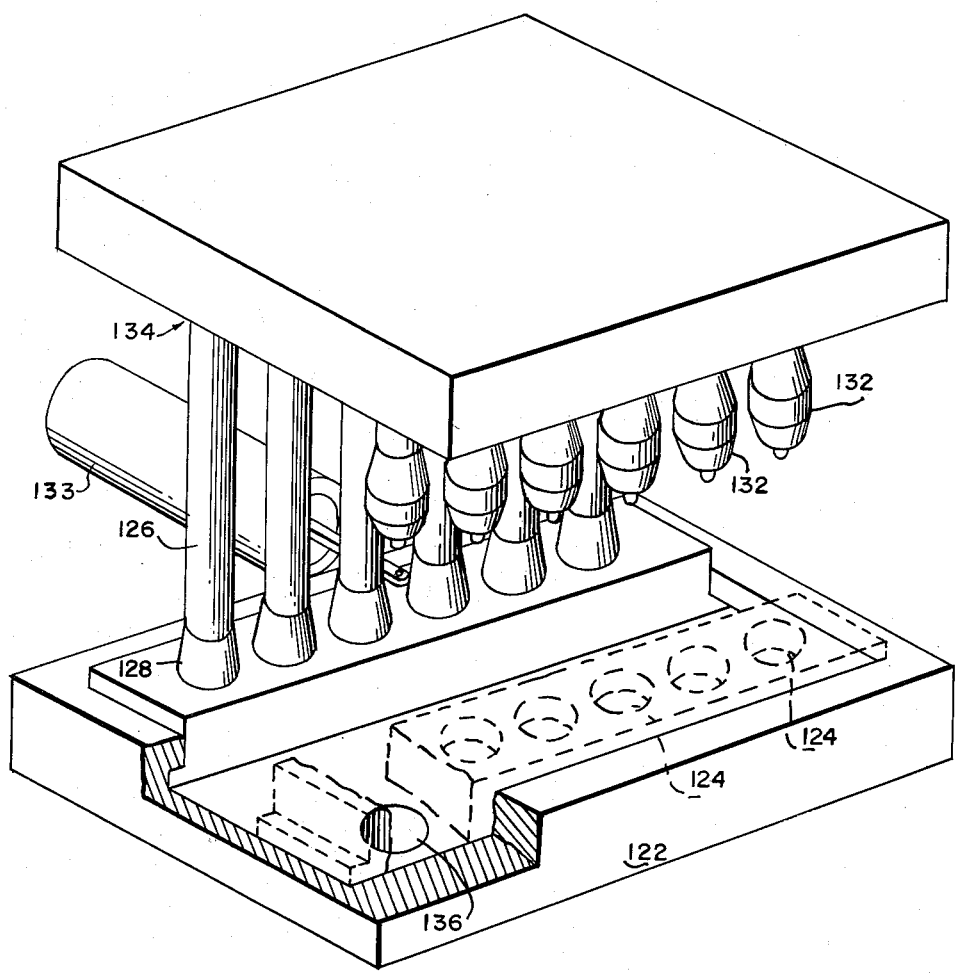
FIGURE 18 is a perspective view somewhat diagrammatically showing a machine in which a multiplicity of tubes are simultaneously produced, the machine, by way of illustration, showing a vertically reciprocating punch carrying a plurality of rows of punching and forming devices, and a slidably disposed die member for cooperating with the forming instrumentalities and being reciprocated laterally.

The present invention lends itself readily to mass production methods, as is illustrated, for example, in FIGURE 18. Thus, in FIGURE 18 there is provided a mold 122 having a plurality of die cavities 124, and a plurality of plungers 126 fitting into the die cavities, as described above, resulting in the formation of a plurality of tubes 128. There is also provided a second series of plungers 132. The plungers 132 are in position to have the formed tubes removed therefrom when the plungers 126 are in the tube-forming position, and conversely. The die cavities 124 are designed to shuttle back and forth or reciprocate between positions under the plungers 126 and 132, as indicated by the arrows. Reciprocating piston 133 or other reciprocating means can be utilized to shuttle the die cavities back and forth.

The dotted lines indicate the position of the die cavities 124 when they are under plungers 132. In this manner, one die cavity serves two separate plungers. While the tubes 128 are being formed by plungers 124 in the lowered position, previously formed tubes 134 are being removed from the other plungers 132 by means of an air jet or forcible mechnical means, or other suitable modus operandi. Thus, the formed tubes 134 can be ejected through the die block holes 136 which are exposed when the die cavities 124 are in the reverse tube-forming position.

The tube-forming blanks can be inserted into the die cavities 124 by any suitable mechanical or hand operation.

Figure 19:
FIGURE 19 is a sectional view of a laminate type of planchette.
Figure 20:
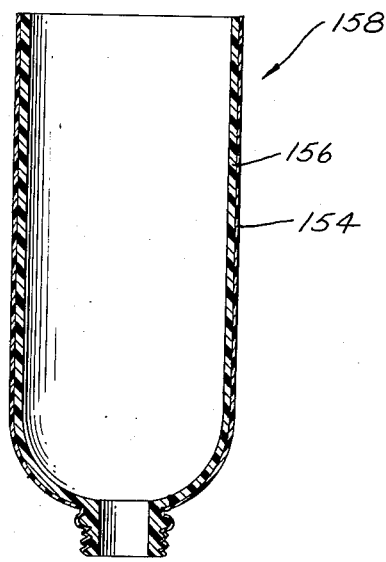
FIGURE 20 is a sectional view of a tube made from the planchette of FIGURE 19.

The process employed in the present invention can be utilized to form a laminated tube as previously set forth. Thus, as shown in FIGURES 19 and 20, there is provided a laminated planchette having a relatively thick interior layer 150 of polyethylene and a relatively thin exterior layer 152 of vinylidene chloride resin. Utilizing the apparatus shown in FIGURES 1 and 2, for example, with the laminated planchette of FIGURE 19 there is obtained the laminated tube 158 of FIGURE 20. Tube 158 comprises a relatively thick interior polyethylene layer 156 and a relatively thin vinylidene chloride resin exterior layer 154.

We claim:
1. A process of impact forming a hollow tube comprising inserting a planchette of a solid thermoplastic synthetic resin having a break limit of at least 300% and an elastic limit of at most one half the break limit in an open die and impacting a plunger of lesser external diameter than the internal diameter of said die against the planchette in said die with sufficient force to cause the resin to rise around the plunger well beyond the upper wall of the die to exceed the elastic limit but not to exceed the break limit of said resin to form said hollow tube.

2. A process according to claim 1 wherein the resin is polyethylene.

3. A process according to claim 1 wherein the resin is polyethylene and there is also present a minor amount of a rubbery hydrocarbon polymer in the planchette.

4. A process according to claim 1 wherein the resin is polyethylene and there is also present a minor amount of a hydrocarbon wax in the planchette.

5. A process according to claim 1 wherein the resin is polyethylene and there is also present a minor amount of a stearate in the planchette.

6. A process according to claim 1 wherein the planchette is a laminate of at least two different resins having a break limit of at least 300% and an elastic limit of at most half the break limit.

7. A process according to claim 6 wherein one of the resins is polyethylene.

8. A process of impact forming a hollow tube comprising inserting a planchette which is a laminate of a relatively thick layer of polyethylene and a relatively thin layer of a different thermoplastic material having a break limit at least 300% in an open die and impacting a plunger of lesser external diameter than the internal diameter of said die against the planchette in said die with sufficient force to cause the resin to rise around the plunger well beyond the upper wall of the die to exceed the elastic limit but not to exceed the break limit of the polyethylene.

9. A process of impact forming a transparent polyethylene hollow tube comprising inserting a planchette of polyethylene having a break limit of at least 300% and an elastic limit of at most one half the break limit in an open die having a highly polished surface and impacting a plunger having a highly polished surface against the planchette in said die with sufficient force to cause the polyethylene to rise around the plunger well beyond the upper wall of the die and to exceed the elastic limit but not to exceed the break limit of the polyethylene to form said transparent, hollow, polyethylene tube.

10. A process according to claim 1 wherein the resin is polypropylene.

11. A process according to claim 1 wherein the synthetic resin is selected from the group consisting of polyethylene, polyvinyl alcohol, polyvinyl acetals, polypropylene and vinyl chloride resins.

12. A process according to claim 1 wherein the resin is a vinyl chloride resin.

13. A tube prepared by the process of claim 9.

14. A process according to claim 1 wherein the planchette is a laminate of polyethylene with a vinylidene chloride resin in an amount to obtain a hollow tube having a coating of vinylidene chloride resin in an amount not over about 10% of the thickness of the polyethylene layer of said tube.

15. A process of forming a hollow tube using an open die and a plunger, said plunger having a stem portion provided with a land portion adjacent one end thereof, and a collar freely slidable on said stem portion, the land portion having a peripheral dimension greater than the peripheral dimension of the stem portion and substantially equal to the peripheral dimension of the tube to be formed, the peripheral dimension of said collar adjacent said land portion being of a lesser peripheral dimension than the peripheral dimension of said land portion and tapering outwardly in a direction away from said land portion to a dimension substantially equal to the peripheral dimension of said land portion, said process comprising inserting a planchette of a solid thermoplastic synthetic resin having a break limit of at least 300% and an elastic limit of at most one-half the break limit in said open die, impacting said plunger having said freely slidable collar against said planchette in said die with sufficient force to cause the resin to rise around the plunger well beyond the upper wall of the die to exceed the elastic limit but not to exceed the break limit of said resin whereby said hollow tube as it is formed will ride up said plunger on said collar.

References Cited in the file of this patent

UNITED STATES PATENTS

| | | |
|---|---|---|
| 1,477,094 | Wilson | Dec. 11, 1923 |
| 1,823,180 | White et al. | Sept. 15, 1931 |
| 1,966,877 | Witte | July 17, 1934 |
| 1,984,307 | Keller | Dec. 11, 1934 |
| 2,130,254 | Visman | Sept. 13, 1938 |
| 2,232,475 | Renfrew et al. | Feb. 18, 1941 |
| 2,327,228 | Umlandt | Aug. 17, 1943 |
| 2,337,701 | Weinberg | Dec. 28, 1943 |
| 2,413,323 | Hills | Dec. 31, 1946 |
| 2,418,155 | Bogoslowsky | Apr. 1, 1947 |
| 2,441,470 | Carswell | May 11, 1948 |
| 2,485,885 | Hoopes | Oct. 25, 1949 |
| 2,700,211 | Woolf | Jan. 25, 1955 |
| 2,708,772 | Moncrieff | May 24, 1955 |
| 2,764,804 | Arness | Oct. 2, 1956 |
| 2,808,346 | Lutgerhorst | Oct. 1, 1957 |

FOREIGN PATENTS

| | | |
|---|---|---|
| 138,518 | Australia | Aug. 29, 1950 |